United States Patent
Leonard et al.

(10) Patent No.: US 9,932,102 B2
(45) Date of Patent: Apr. 3, 2018

(54) LOCK ASSEMBLIES FOR FEMALE DRIVE RECEPTACLES

(71) Applicant: The Boeing Company, Chicago, IL (US)

(72) Inventors: Edward W. Leonard, Fife, WA (US); Gregory W. Swanson, Burien, WA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 14/838,120

(22) Filed: Aug. 27, 2015

(65) Prior Publication Data

US 2017/0058570 A1    Mar. 2, 2017

(51) Int. Cl.

| | | |
|---|---|---|
| *F16B 19/00* | (2006.01) | |
| *B64C 1/14* | (2006.01) | |
| *E05B 67/38* | (2006.01) | |
| *E05B 17/14* | (2006.01) | |
| *E05B 35/00* | (2006.01) | |

(52) U.S. Cl.
CPC ............ *B64C 1/1415* (2013.01); *E05B 17/14* (2013.01); *E05B 67/383* (2013.01); *E05B 17/142* (2013.01); *E05B 35/008* (2013.01)

(58) Field of Classification Search
CPC .......... E05B 17/14; E05B 17/16; E05B 67/38; B64C 1/1415
USPC ............................................. 70/58, 423, 424
See application file for complete search history.

(56) References Cited

U.S. PATENT DOCUMENTS

| | | | | |
|---|---|---|---|---|
| 606,734 A * | 7/1898 | Olmstead | | |
| 786,843 A * | 4/1905 | Robeson | | |
| 890,871 A * | 6/1908 | Reed | | |
| 1,101,450 A * | 6/1914 | Kerry | ...................... | E05B 17/16 70/424 |
| 1,470,937 A * | 10/1923 | Schou | ...................... | E05B 17/16 70/424 |
| 1,666,542 A * | 4/1928 | Scally | ...................... | E05B 17/16 70/424 |
| 2,577,956 A * | 12/1951 | Elsberg | ................... | E05B 17/16 70/424 |
| 3,496,742 A * | 2/1970 | Beard | ....................... | E05C 5/04 70/232 |
| 5,370,488 A * | 12/1994 | Sykes | ..................... | F16B 21/02 411/551 |
| 5,609,020 A | 3/1997 | Jackson et al. | | |
| 6,109,563 A | 8/2000 | Verhoeven et al. | | |

\* cited by examiner

*Primary Examiner* — Gary W Estremsky
(74) *Attorney, Agent, or Firm* — Dascenzo Intellectual Property Law, P.C.

(57) ABSTRACT

Lock assemblies for locking female drive receptacles include a portion with a feature that is configured to permit selective insertion of the portion of the lock assembly into the female drive receptacle when the portion is in a first rotational orientation and to selectively restrict removal of the portion from the non-circular receptacle when the portion is in a second rotational orientation that is offset from the first rotational orientation. The lock assembly is configured to receive a padlock to restrict rotation of the portion from the second rotational orientation to the first rotational orientation and thereby lock the lock assembly to the female drive receptacle.

27 Claims, 5 Drawing Sheets

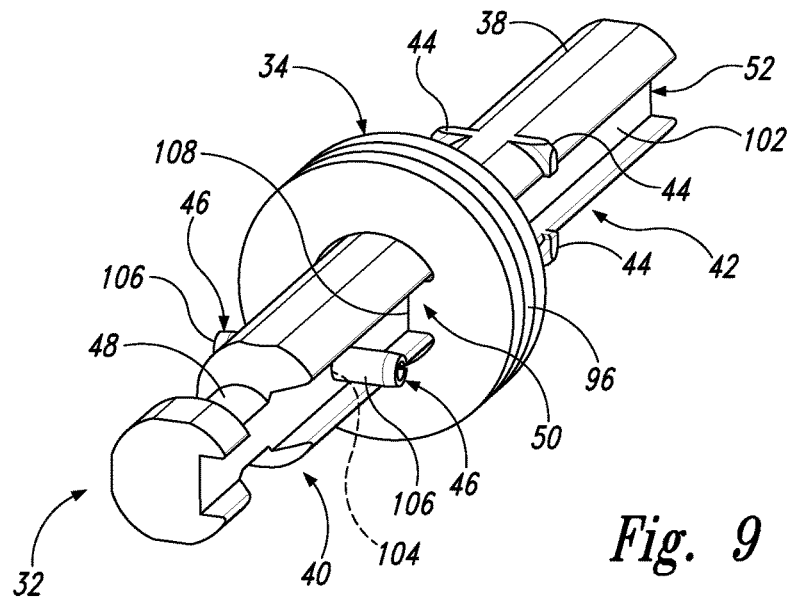
*Fig. 9*
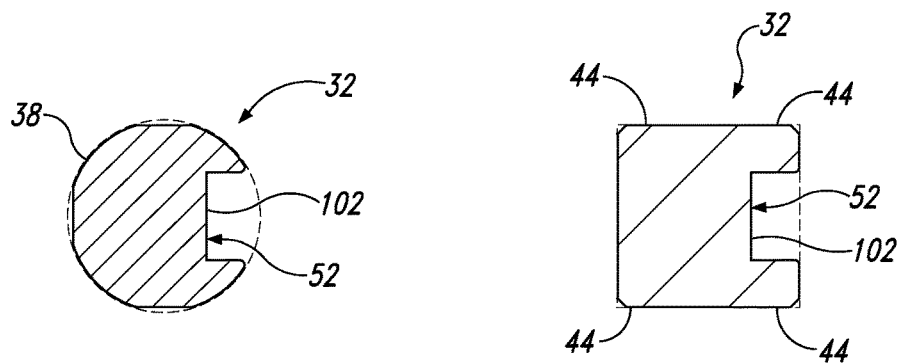
*Fig. 10*   *Fig. 11*
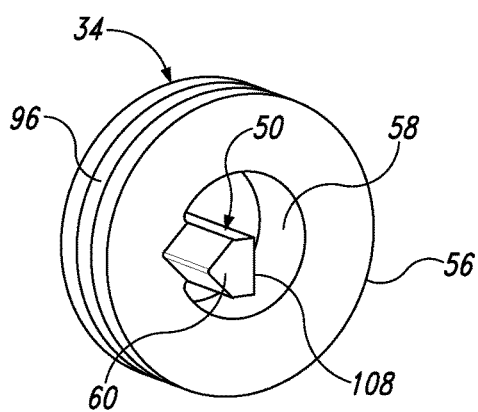
*Fig. 12*

LOCK ASSEMBLIES FOR FEMALE DRIVE RECEPTACLES

FIELD

The present disclosure relates to the locking of female drive receptacles.

BACKGROUND

Various configurations of drive structures, such as flathead screw drivers, Phillips screwdrivers, hex drivers (e.g., ALLEN™ drivers), square drivers, and star drivers, as well as correspondingly shaped female drive receptacles, exist. Female drive receptacles may be defined in a fastener, such as a screw or bolt, or in a shaft or other linkage that is operatively connected to a mechanical assembly where a selective rotational input or output is utilized. For example, in the aerospace industry, square female drive receptacles are often used for external manual override access to cargo bay doors of aircraft. In such applications, a cargo bay door may be selectively operated from within the aircraft, such as via control of a motorized and/or hydraulic system operated by the aircraft's crew. Such a system may be disabled via the internal controls by the crew, but the external manual override access may still function to manually open the cargo bay door from external the aircraft. Therefore, it may be desirable to disable the external manual override access for maintenance, security, or redundancy, for example.

SUMMARY

Lock assemblies for female drive receptacles and methods of using the same are disclosed. Lock assemblies include an insert with a feature that is configured to permit selective insertion of the insert into the female drive receptacle when the insert is in a first rotational orientation and to selectively restrict removal of the insert from the non-circular receptacle when the insert is in a second rotational orientation that is offset from the first rotational orientation. The lock assembly is configured to be locked to restrict rotation of the insert from the second rotational orientation to the first rotational orientation and thereby lock the lock assembly to the female drive receptacle.

In some embodiments, the lock assembly includes an insert, a slide, and a lock-out assembly. The insert has an elongate body with a distal region and a proximal region. The distal region is configured to be selectively inserted into the female drive receptacle when the insert is in its first rotational orientation, and the distal region is configured to restrict removal of the distal region from the female drive receptacle when the insert is in its second rotational orientation, the second rotational orientation being offset from the first rotational orientation. The slide is slidingly coupled to the insert and is configured to selectively engage the female drive receptacle to selectively restrict rotation of the slide and the insert relative to the female drive receptacle. The lock-out assembly is configured to be selectively coupled to the proximal region of the elongate body to restrict translation of the slide from the distal region to the proximal region of the elongate body and to restrict access to the proximal region of the elongate body. The lock-out assembly is further configured to be selectively restricted from being decoupled from the insert.

BRIEF DESCRIPTION OF THE DRAWINGS

FIG. 9 is an isometric view of the insert and slide of the example lock assembly of FIG. 8.
FIG. 10 is a cross-sectional view of the insert of the example lock assembly of FIG. 8.
FIG. 11 is another cross-sectional view of the insert of the example lock assembly of FIG. 8.
FIG. 12 is an isometric view of the slide of the example lock assembly of FIG. 8.

DESCRIPTION

Figure 1:
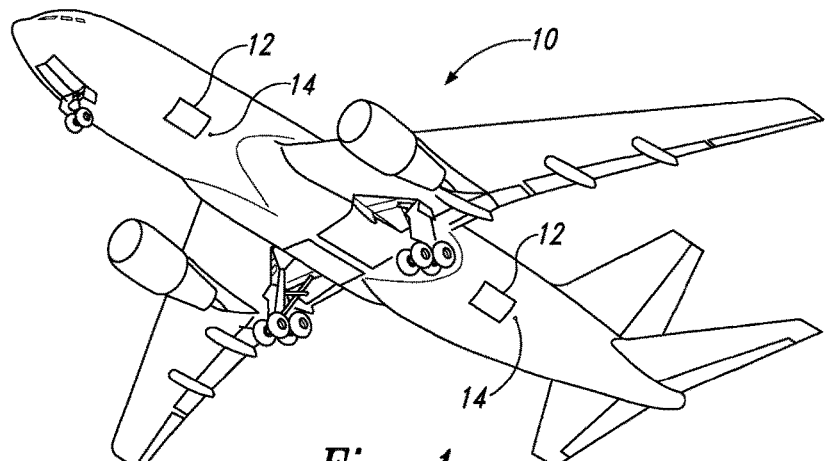
FIG. 1 is a view of an example airplane.

Lock assemblies for female drive receptacles, and corresponding methods, are disclosed. Lock assemblies according to the present disclosure may be used to lock any suitable female drive receptacle. For example, with reference to FIG. 1, it is common for airplanes 10 to have cargo bay doors 12 that may be manually opened and closed by selectively rotating a female drive receptacle 14 that is accessible from outside the airplane. In particular, such airplanes typically include square female drive receptacles. However, lock assemblies according to the present disclosure are not limited to being used in connection with airplanes, cargo bay doors, aircraft, or the aerospace industry in general. Moreover, lock assemblies according to the present disclosure may be configured for use with any suitable shape of female drive receptacles and are not limited to being used with square female drive receptacles.

Figure 2:
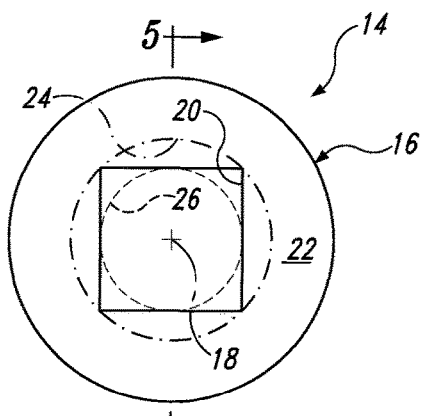
FIG. 2 is an end view of an example female drive receptacle.
Figure 3:
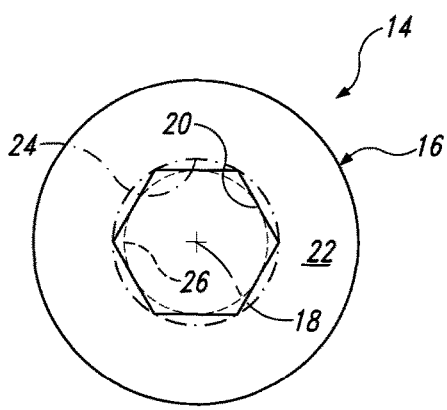
FIG. 3 is an end view of another example female drive receptacle.
Figure 4:
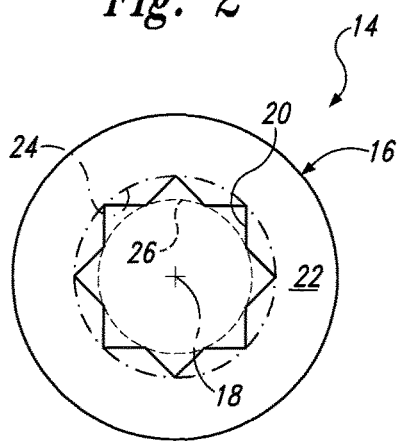
FIG. 4 is an end view of another example female drive receptacle.

Examples of female drive receptacles 14 are schematically illustrated in FIGS. 2-5. With reference to FIGS. 2-5, a female drive receptacle 14 may be described as including a shaft 16 having a longitudinal axis 18 and a non-circular receptacle 20 that extends from an end face 22 of the shaft 16 along the longitudinal axis 18 of the shaft 16. Non-circular receptacles 20 may have any suitable shape in profile or cross-section, including (but not limited to) polygons, triangles, rectangles, squares, pentagons, hexagons, and star shapes. As examples of more typical female drive receptacles, FIG. 2 illustrates a female drive receptacle 14 with a square non-circular receptacle 20, FIG. 3 illustrates a female drive receptacle 14 with a hexagonal non-circular receptacle 20, and FIG. 4 illustrates a female drive receptacle 14 with an eight-pointed star-shaped non-circular receptacle 20.

Figure 5:
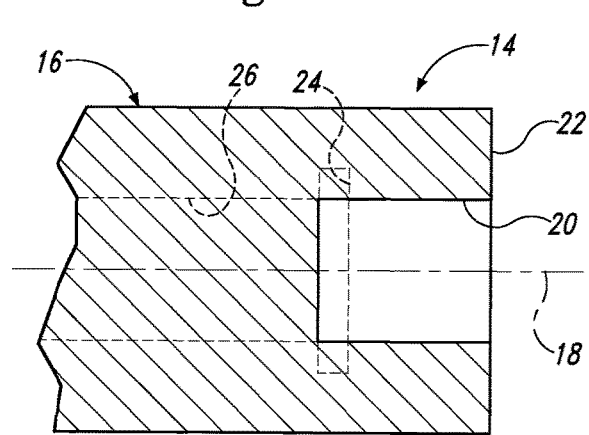
FIG. 5 is a schematic fragmentary, cross-sectional view of an example female drive receptacle, such as according to the line 5-5 in FIG. 2.

With reference to FIG. 5, some shafts 16 of female drive receptacles 14 have a circumferential recess 24 that extends radially from the non-circular receptacle 20. When present, the circumferential recess 24 is a distance, or depth, away from the end face 22 of the shaft 16. As schematically illustrated by the hidden lines in FIGS. 2-4, the circumferential recess 24 may be circular in cross-section, or profile. In addition, some shafts 16 further have a bore 26 that extends beyond the circumferential recess 24 relative to the non-circular receptacle 20. As optionally illustrated in dashed lines in FIGS. 2-4, this optional bore 26 may be circular in cross-section, or profile, and may have a diameter that generally corresponds to an inner dimension of the non-circular receptacle 20. However, other configurations of shafts 16 are within the scope of female drive receptacles 14 according to the present disclosure.

Figure 6:
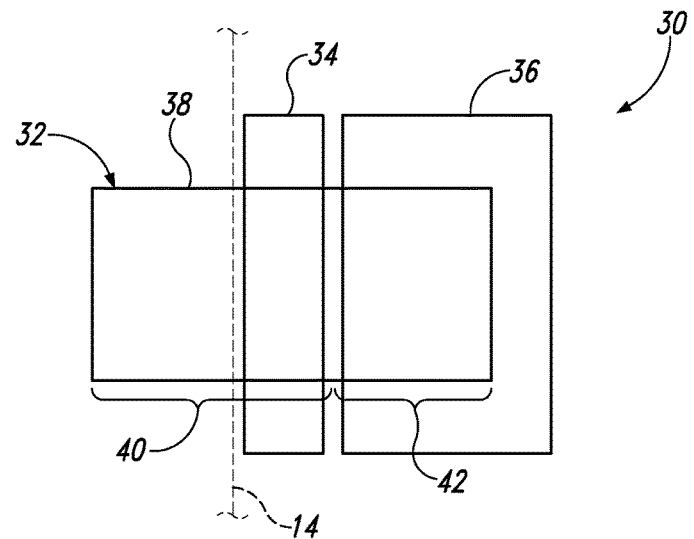
FIG. 6 is a schematic diagram representing lock assemblies according to the present disclosure.

Turning now to FIG. 6, lock assemblies 30 for female drive receptacles 14 include an insert 32, a slide 34, and a lock-out assembly 36.

The insert 32 includes an elongate body 38 having a distal region 40 and a proximal region 42. The distal region 40 is configured to be selectively inserted into a female drive receptacle 14 when the insert 32 is in a first rotational orientation relative to the female drive receptacle 14. The distal region 40 is further configured to restrict removal of the distal region 40 from the female drive receptacle 14 when the insert is in a second rotational orientation that is offset from the first rotational orientation.

The slide 34 is slidingly coupled to the insert 32 and is configured to selectively engage the female drive receptacle 14 to selectively restrict rotation of the slide 34 and the insert 32 relative to the female drive receptacle 14.

The lock-out assembly 36 is configured to be selectively coupled to the proximal region 42 of the insert's elongate body 38 to restrict translation of the slide 34 from the distal region 40 to the proximal region 42 of the insert's elongate body 38 and to also restrict access to the proximal region 42 of the elongate body 38. Accordingly, when the distal region 40 of the elongate body 38 is within the female drive receptacle 14, when the insert 32 has been rotated to its second rotational orientation, when the slide 34 is engaged with the female drive receptacle 14, and when the lock-out assembly 36 is operatively coupled to the proximal region 42 of the elongate body 38, the insert 32 cannot be directly engaged by a user to rotate insert 32 from the second rotational position to permit removal of the distal region 40 from the female drive receptacle 14.

In addition, the lock-out assembly 36 is configured to be selectively restricted from being decoupled from the insert 32. For example, the lock-out assembly 36 may be configured to operatively receive a padlock that, when locked to the lock-out assembly 36, restricts the lock-out assembly 36 from being decoupled from the insert 32. As another example, the lock-out assembly 36 may have an integral locking device that utilizes a key or other user input (e.g., a dial, push buttons, key pad, etc.) for locking and unlocking the locking device.

Stated in terms of a method, a female drive receptacle 14 may be locked by a lock assembly 30 by first, inserting the insert 32 into the female drive receptacle 14; second, rotating the insert 32; third, sliding the slide 34 into engagement with the female drive receptacle 14; fourth, operatively coupling the lock-out assembly 36 to the insert 32; and fifth, restricting the lock-out assembly 36 from being decoupled from the insert 32.

Figure 7:
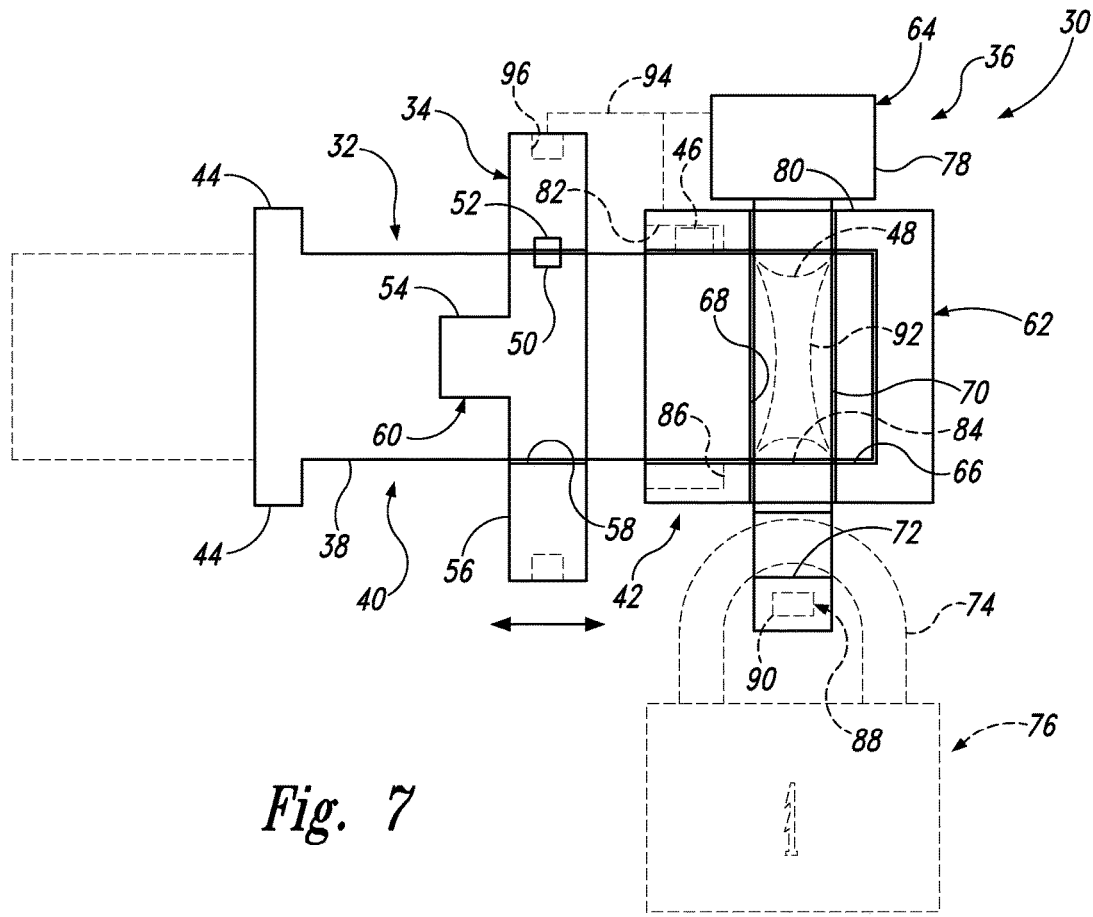
FIG. 7 is another schematic diagram representing lock assemblies according to the present disclosure.

Turning now to FIG. 7, illustrative, non-exclusive examples of lock assemblies 30 are schematically represented in greater detail. More specifically, the lock assemblies represented in FIG. 7 may be configured for use with female drive receptacles 14 having a non-circular receptacle 20 and a circumferential recess 24, as discussed above in connection with FIGS. 2-5.

As mentioned, the elongate body 38 of the insert 32 has a distal region 40 and a proximal region 42. In some embodiments, at least the distal region 40 may be shaped to be selectively inserted into the non-circular receptacle 20 of the shaft 16 of a female drive receptacle 14. In other words, a perpendicular profile of the distal region 40 at its greatest extent is sized to fit within the non-circular receptacle 20. In some embodiments, the outer periphery of the distal region 40 may in profile define in part a circle. By "in profile define in part" a shape, it is meant that the perpendicular profile of the outer periphery is not necessarily the complete shape (e.g., a circle) itself, but rather the outer contoured surfaces comprise portions of the shape that if interconnected would generally define the shape. Moreover, an outer diameter of the circle may generally correspond to an inner dimension of the non-circular receptacle 20 for which the lock assembly 30 is designed. For example, with reference to the schematic representation of the female drive receptacle 14 of FIG. 2 having a square non-circular receptacle 20, an outer diameter of the circle corresponding to the distal region 40 of an elongate body 38 of an insert 32 may be approximately equal to the length of a side of the square. Similarly, with reference to the schematic representation of the female drive receptacle 14 of FIG. 3 having a hexagonal non-circular receptacle 20, an outer diameter of the circle corresponding to the distal region 40 of an elongate body 38 of an insert 32 may be approximately equal to the distance from one side of the hexagon to an opposite side of the hexagon. Distal regions 40 of elongate bodies 32 may be similarly configured for use with various other non-circular receptacles 20.

As schematically illustrated in FIG. 7, in some embodiments, the insert 32 includes one or more distal projections 44 that extend radially outward from the distal region 40 of the elongate body 38. When present, the one or more distal projections 44 are sized to permit selective insertion of the distal region 40 into the non-circular receptacle 20 of the shaft 16 of a female drive receptacle 14 when the insert 32 is in a rotationally aligned orientation. For example, in profile, the one or more distal projections 44 may extend beyond the circle that is defined in part by the profile of the distal region 40, such that the one or more distal projections 44 would engage the end face 22 of the shaft 16 of a female drive receptacle 14, unless the one or more distal projections 44 were rotationally positioned to fit into the non-circular receptacle 20. For example, with reference again to the schematic representation of the female drive receptacle 14 of FIG. 2 having a square non-circular receptacle 20, the one or more distal projections 44 may need to be rotationally positioned to be aligned with one or more of the corners of the square so as to avoid engaging the end face 22 and restricting insertion of the one or more distal projections 44 into the non-circular receptacle 20. The one or more distal projections 44 may be similarly configured for use with various other non-circular receptacles 20.

In addition, when present, the one or more distal projections 44 are sized to extend into the circumferential recess 24 of the shaft 16 and thereby restrict longitudinal motion of the insert 32 when the insert 32 is rotated from the rotationally aligned orientation to a rotationally misaligned orientation. For example, as understood with reference to FIG. 5, when one or more distal projections 44 of an insert 32 are rotated to extend into the circumferential recess 24, the one or more distal projections 44 will restrict withdrawal of the distal region 40 from the non-circular receptacle 20. As used herein, reference to a "longitudinal" direction, motion, or other reference corresponds to the longitudinal axis 18 of a female drive receptacle's shaft 16, and thus to a corresponding longitudinal axis of an insert 32 when operatively received within a female drive receptacle 14.

In some embodiments, an outer periphery of the one or more distal projections 44 in profile may define in part a shape that corresponds to the non-circular receptacle 20. For example, the shape may be a polygon, a triangle, a rectangle, a square, a pentagon, a hexagon, or star-shaped. Other shapes of non-circular receptacles, and thus of outer peripheries of distal projections 44, also are within the scope of the present disclosure.

As schematically and optionally illustrated in dashed lines in FIG. 7, in some embodiments, the distal region 40 of the elongate body 38 of an insert 32 may extend beyond the one or more distal projections 44 relative to the proximal region 42. For example, such a configuration of an elongate body 38 may be suitable for use with female drive receptacles 14 that include a bore 26 that extends beyond the circumferential groove 24, as discussed above and optionally illustrated in FIG. 5.

With continued reference to FIG. 7, in some embodiments, an insert 32 also may include a proximal projection 46 that extends radially outward from the proximal region 42 of the elongate body 38. When present, the proximal projection 46, together with the one or more distal projections 44, may serve to operatively retain the slide 34 on the insert 32, or otherwise coupled to the insert 32.

In some embodiments, the proximal region 42 of the elongate body 38 of the insert 32 may define, or include, a circumferential groove 48, as schematically and optionally illustrated in dashed lines in FIG. 7. As used herein, a "circumferential groove" is a groove, channel, or recess that extends into a structure, generally around the circumference or periphery thereof. When present, the circumferential groove 48 of an elongate body 38 may be configured to operatively function with a corresponding lock-out assembly 36, as discussed herein.

As mentioned, lock assemblies 30 include a slide 34 that is slidingly coupled to the insert 32 and that is configured to be selectively translated along the elongate body 38 of the insert 32. In some embodiments, the slide 34 may include a slide body 56 that defines a slide bore 58 through which the elongate body 38 of the insert 32 extends. In addition, the slide body 56 may be sized to engage the end face 22 of the shaft 16 of a female drive receptacle 14 when the distal region 40 of the insert's elongate body 38 is inserted into the non-circular receptacle 20 and when the slide 34 is translated along the elongate body 38 toward the shaft 16. In some embodiments, the slide body 56 may be generally disc-shaped, but other configurations also are within the scope of the present disclosure.

In some embodiments, the slide 34 includes a slide insert feature 50, and the insert 32 includes a corresponding insert slide feature 52 that is mated with the slide insert feature 50. When present, the slide insert feature 50 and the insert slide feature 52 collectively restrict relative rotation between the insert 32 and the slide 34 about the longitudinal axis of the insert 32. For example, one of the insert slide feature 52 and the slide insert feature 50 may be a groove, and the other of the insert slide feature 52 and the slide insert feature 50 may be a tab, or other structure, that is positioned in the groove. Other configurations of insert slide features 52 and slide insert features 50 also are within the scope of the present disclosure.

In some embodiments, the slide 34 also may include a receptacle feature 54 that is configured to be selectively inserted into the non-circular receptacle 20 of the shaft 16 of a female drive receptacle 14 to restrict rotation of the slide 34 relative to the shaft 16. For example, the receptacle feature 54 may be defined by a longitudinal projection 60 that extends longitudinally from the slide body 56. In some embodiments, an outer periphery of the longitudinal projection 60 in profile may define in part a shape that corresponds to the non-circular receptacle 20. For example, the shape may be a polygon, a triangle, a rectangle, a square, a pentagon, a hexagon, or star-shaped. More specifically, in some embodiments, the longitudinal projection 60 may be sized and shaped to generally fit within a corner of a non-circular receptacle 20, such that engagement between the longitudinal projection 60 and the corner of the non-circular receptacle 20 restricts rotation of the slide 34 relative to the shaft 16. Moreover, when present, the shape corresponding to the longitudinal projection 60 also may correspond to the shape corresponding to the one or more distal projections 44, discussed above, but being angularly offset therefrom. Accordingly, when the insert 32 is in its rotationally aligned orientation, the distal region 40 of the elongate body 38 is permitted to be received in the non-circular receptacle 20. When the insert 32 is in its rotationally aligned orientation, the longitudinal projection 60 of the slide will engage the end face 22 of the shaft 16, thereby restricting the longitudinal projection 60 from being received in the non-circular receptacle 20. However, when the insert 32 is rotated to the rotationally misaligned orientation, such that the one or more distal projections 44 extend into the circumferential recess 24 of the shaft 16, the longitudinal projection 60 becomes aligned with the non-circular receptacle 20, such that it may then be received therein, due to the slide insert feature 50 and the insert slide feature 52 rotationally constraining the insert 32 and the slide 34 together.

With continued reference to FIG. 7, in some embodiments, the lock-out assembly 36 may include a block 62 and a lock pin 64. When present, the block 62 may define an insert bore 66 and a pin bore 68 that extends transverse to the insert bore 66. The insert bore 66 is configured to selectively receive the proximal region 42 of the elongate body 38 of the insert 32, as schematically illustrated in FIG. 7. The lock pin 64 is positioned, or may be selectively positioned, in the pin bore 68.

The lock pin 64, when present, may include a pin body 70 that is sized to extend through the pin bore 68 and that defines a shackle bore 72 that is sized to receive a shackle 74 of a padlock 76, as schematically illustrated in FIG. 7. The lock pin 64 also may include a head 78 that is positioned opposite the shackle bore 72 on the pin body 70, with the head 78 being sized to engage an external surface 80 of the block 62 to restrict further translation of the lock pin 64 through the pin bore 68 of the block 62.

The lock pin 64 and the proximal region 42 of the elongate body 38 of the insert 32 may be configured to permit rotation of the block 62 and lock pin 64 relative to the insert 32 when the proximal region 42 is operatively received in the insert bore 66 of the block 62 and when the lock pin 64 is operatively received in the pin bore 68 of the block 62. Accordingly, when a lock assembly 30 is operatively installed on a female drive receptacle 14, rotation of the lock-out assembly 36 will not result in rotation of insert 32, and therefore will not result in rotation of the shaft 16 of the female drive receptacle 14.

In some embodiments, the insert bore 66 extends only partially through the block 62, and therefore may be described as a blind bore. In some embodiments, the insert bore 66 may have a first region 82 that is sized to receive the optional proximal projection 46 and a second region 84 that is sized to restrict receipt of the proximal projection 46 into the second region 84. Stated differently, in some embodiments, the insert bore 66 may define a shoulder 86 that is sized to engage the optional proximal projection 46 when the proximal region 42 is inserted into the insert bore 66 and thereby restrict further insertion of the proximal region 42 into the insert bore 66.

In some embodiments, the pin bore 68 may extend perpendicular to the insert bore 66. In some embodiments, the insert bore 66 and the pin bore 68 intersect within the block 62.

In some embodiments, the lock pin 64 also may include a restrictive feature 88 that extends from the pin body 70 opposite the head 78, such that the head 78 is positioned on one side of the block 62 and the restrictive feature 88 is positioned on the opposite side of the block 62. Accordingly, when present, the restrictive feature 88 and the head 78 collectively retain the lock pin 64 to the block 62 with the pin body 70 in the pin bore 68 of the block 62. As an example, the restrictive feature 88 may be defined by, or include, one or more pin projections 90 that extend from the pin body 70. Additionally, in some embodiments, the pin body 70 may be is sized to, and the restrictive feature 88 may be positioned to, permit selective translation of the lock pin 64 within the pin bore 68 of the block 62. Moreover, the pin body 70 may be sized so that the shackle bore 72 is accessible outside the block 62 when the head 78 is engaged with the external surface 80 of the block 62. Additionally, the shackle bore 72 may be within the block 62 and not accessible when the restrictive feature 88 is engaged with the block 62.

In some embodiments, as schematically and optionally illustrated in FIG. 7, the pin body 70 may define a circumferential groove 92 that is positioned between the head 78 and the shackle bore 72. When the circumferential groove 92 is aligned with the insert bore 66 of the block 62, the proximal region 42 of the elongate body 38 of the insert 32 is permitted to be operatively received into and withdrawn from the insert bore 66. However, when the circumferential groove 92 is not aligned with the insert bore 66, the proximal region 42 is restricted from being operatively received into the insert bore 66 if not already operatively received into the insert bore 66, and is restricted from being withdrawn from the insert bore 66 if already operatively received into the insert bore 66.

Moreover, in embodiments in which the proximal region 42 of the elongate body 38 of the insert 32 includes an optional circumferential groove 48, as discussed above, when the circumferential groove 48 is aligned with the pin bore 68 of the block 62, the lock pin 64 is permitted to be operatively translated within the pin bore 68. However, when the circumferential groove 48 is not aligned with the pin bore 68, the lock pin 64 is restricted from being operatively translated within the pin bore 68.

In some embodiments, as schematically and optionally illustrated in FIG. 7, a lock assembly 30 also may include a tether 94 that interconnects the slide 34 and one or both of the block 62 and the lock pin 64. In some such embodiments, the slide 34 may define an outer circumferential channel 96, and the tether 94 may define a loop that is positioned in the outer circumferential channel 96.

Stated in terms of a method with respect to lock assemblies 30 according to the examples of FIG. 7, a female drive receptacle 14 may be locked by such a lock assembly 30 by first inserting the distal region 40 of the elongate body 38 of the insert 32 into the non-circular receptacle 20; second, rotating the elongate body 38 so that the one or more distal projections 44 extend into the circumferential recess 24; third, sliding the slide 34 toward the female drive receptacle 14 so that the receptacle feature 54 enters the non-circular receptacle 20; fourth, operatively coupling the lock-out assembly 36 to the proximal region 42 of the elongate body 38 to restrict translation of the slide 34 from the distal region 40 to the proximal region 42 of the elongate body 38; and fifth, restricting the lock-out assembly 36 from being decoupled from the proximal region 42 of the elongate body 38.

In some such methods that utilize a lock assembly 30 having a lock-out assembly 36 that has a block 62 and a lock pin 64, the operatively coupling may include operatively positioning the lock pin 64 within the pin bore 68 of the block 62 so that the proximal region 42 of the elongate body 38 of the insert 32 may be received in the insert bore 66 of the block; next positioning the lock-out assembly 36 so that the proximal region 42 is operatively received within the insert bore 66; and then operatively positioning the lock pin 64 within the pin bore 68 so that the proximal region 42 is restricted from being withdrawn from the insert bore 66. In some such methods, the restricting may include placing a padlock 76 or other structure through the shackle bore 72 of the lock pin 64.

Turning now to FIGS. 8-11, an illustrative non-exclusive example of a lock assembly 30 is illustrated and indicated generally at 100. Where appropriate, the reference numerals from the schematic illustrations of FIGS. 6-7 are used to designate corresponding parts of the example of FIGS. 8-11; however, the example of FIGS. 8-11 is non-exclusive and does not limit lock assemblies 30 to the illustrated embodiment of FIGS. 8-11. That is, lock assemblies 30 are not limited to the specific embodiment of FIGS. 8-11, and lock assemblies 30 may incorporate any number of the various aspects, configurations, characteristics, properties, etc. of lock assemblies 30 that are illustrated in and discussed with reference to the schematic representations of FIGS. 6-7 and/or the embodiment of FIGS. 8-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 8-11; however, it is within the scope of the present disclosure that the previously discussed features, variants, etc. may be utilized with the example of FIGS. 8-11.

Figure 8:
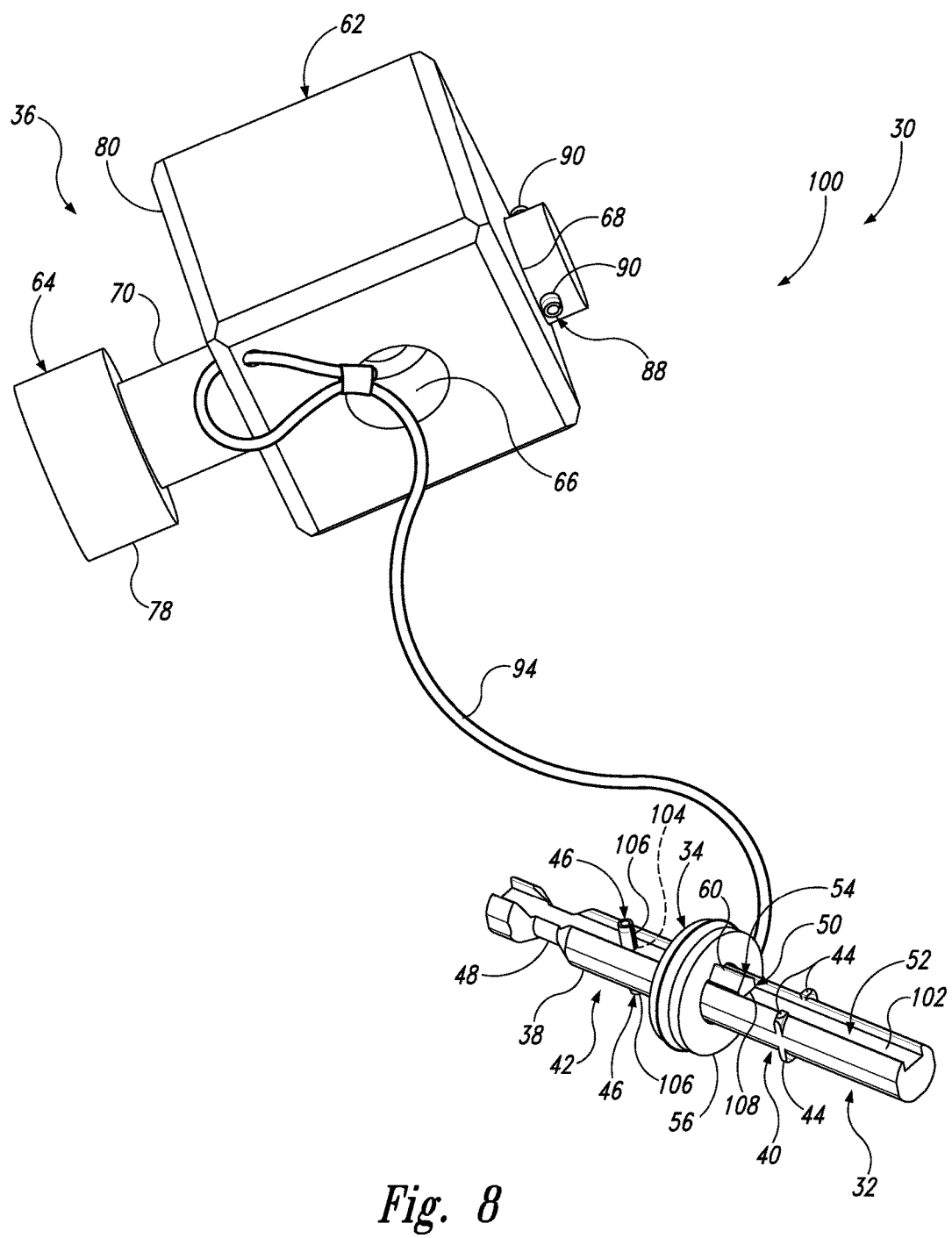
FIG. 8 is an isometric view of an example lock assembly according to the present disclosure.

As seen in FIG. 8, lock assembly 100 is an example of a lock assembly 30 that includes an insert 32, a slide 34, and a lock-out assembly 36 having a block 62 and a lock pin 64. Accordingly, lock assembly 100 is an example of a lock assembly 30 according to the schematic illustration of FIG. 7, and more specifically is a lock assembly that is configured for use with a female drive receptacle having a square non-circular receptacle 20, a circumferential recess 24, and a bore 26. Lock assembly 100 includes an optional tether 94 that couples together the slide 34 and the block 62. Moreover, because the lock pin 64 is coupled to the block 62, all of the component parts of lock assembly 100 are operatively coupled together. Thus, lock assembly 100 may be described as anti-FOB (foreign object damage).

With reference to FIGS. 9-10, the insert 32 of lock assembly 100 is an example of an insert 32 that has a distal region 40 whose profile defines in part a circle, as represented by the dashed circle in FIG. 10 being concentric with the outer periphery of the distal region. Moreover, the elongate body 38, as a whole, substantially has a profile that defines in part a circle, as perhaps best seen in FIG. 9. In addition, the insert 32 of lock assembly 100 is an example of an insert 32 whose distal region 40 extends beyond the distal projections 44 relative to the proximal region 42 for suitable use with a female drive receptacle 14 having a bore 26.

With reference to FIGS. 9 and 11, the insert 32 of lock assembly 100 is an example of an insert 32 having four distal projections 44 that extend radially outward from the distal region 40 and that define in profile in part a square for use of the lock assembly 100 with a square non-circular receptacle 20, as represented by the dashed square in FIG. 11 being co-extensive with the outer periphery of the distal projections 44.

As seen in FIG. 9, the elongate body 38 of the insert 32 of lock assembly 100 defines an insert slide feature 52 in the form of a longitudinal channel 102 extending along an entirety of the elongate body 38 for mating with the slide insert feature 50 of the slide 34. However, it is within the scope of lock assemblies 30, that such a channel extend for less than an entire length of the elongate body 38, such as solely within the distal region 40 thereof. The elongate body 38 of the insert 32 of lock assembly 100 also defines a circumferential groove 48 in the proximal region 42 of the elongate body 38 for operatively functioning with the lock-out assembly 36. The insert 32 of lock assembly 100 also includes a proximal projection 46 that extends radially outward from the proximal region 42 of the elongate body 38. More specifically, the elongate body 38 defines a proximal bore 104, and the proximal projection 46 is in the form of a proximal pin 106 that is press-fit into the proximal bore 104. The proximal pin 106 and the distal projections 44 function to retain the slide 34 on the elongate body.

With reference to FIGS. 9 and 12, the slide 34 of lock assembly 100 is an example of a slide 34 having a disc-shaped slide body 56 with a slide bore 58, through which the elongate body 38 of the insert 32 extends. The slide body 56 also has an outer circumferential channel 96, within which the tether 94 extends, as seen in FIG. 9. The slide 43 of lock assembly 100 includes an insert slide feature 52 in the form of a tab 108 that extends into, and is sized and shaped to correspond to, the longitudinal channel 102 of the elongate body 38, thereby restricting relative rotation between the slide 34 and the insert 32. In addition, the receptacle feature 54 of the slide 34 of lock assembly 100 is in the form of a longitudinal projection 60 that in profile defines a squared corner to correspond to a square non-circular receptacle 20 of a female drive receptacle 14. Moreover, the squared corner is offset 45° from the square profile of the distal projections 44.

Figure 13:
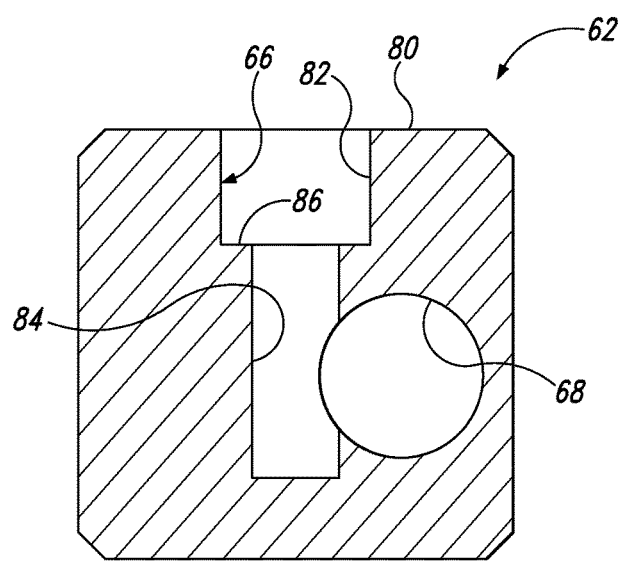
FIG. 13 is a cross-sectional view of the block of the example lock assembly of FIG. 8.

Turning now to FIG. 13 and with continued reference to FIG. 9, the block 62 of lock assembly 100 defines an insert bore 66 that extends only partially into the block 62. In addition, the insert bore 66 is stepped, including a first region 82 having a smaller diameter than a second region 84, such that the insert bore 66 may receive the proximal pin 106 of the insert 32 into the first region 82 but not into the second region 84. The block 62 defines a pin bore 68 that extends completely through the block 62 and that intersects the insert bore 66.

Figure 14:
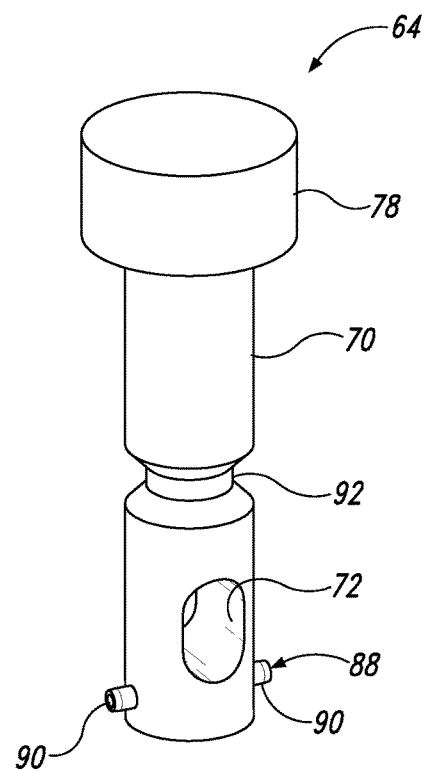
FIG. 14 is an isometric view of the lock pin of the example lock assembly of FIG. 8.

Turning now to FIG. 14 and with continued reference to FIG. 9, the lock pin 64 of lock assembly 100 extends completely through the pin bore 68 of the block 62. The lock pin 64 includes a head 78 and a restrictive feature 88 that extends from the pin body 70 opposite the head 78. More specifically, the restrictive feature 88 is in the form of two pin projections 90 that extend from the pin body 70, which together with the head 78 retain the lock pin 64 to the block 62 with the pin body 70 extending through the pin bore 68. The pin body 70 also defines a shackle bore 72 that extends through the pin body 70 between the pin projections 90 and the head 78, and that is sized to receive a shackle 74 of a padlock 76. As seen in FIG. 14, the pin body 70 also defines a circumferential groove 92 positioned between the head 78 and the shackle bore 72 for selective alignment with the insert bore 66 and thus for operatively permitting the proximal region 42 of the elongate body 38 of the insert 32 to be operatively received into the insert bore 66.

Accordingly, the lock assembly 100 may be used to lock a female drive receptacle 14 having a square non-circular receptacle 20 by first, inserting the distal region 40 of the elongate body 38 of the insert 32 into the non-circular receptacle 20 with the insert 32 in its rotationally aligned orientation. Second, when the distal projections 44 are aligned with the circumferential recess 26 of the female drive receptacle 14, rotating the insert 32 45° from its rotationally aligned orientation to its rotationally misaligned orientation. Third, with the distal projections 44 in the recess 26, the slide 34 is translated toward and into engagement with the end face 22 of the female drive receptacle's shaft 16, so that the longitudinal projection 60 of the slide 34 is received within the square corner of the square non-circular receptacle 20. Fourth, with the lock pin's circumferential groove 92 aligned with the insert bore 66 of the block 62, the lock-out assembly 36 is positioned over the proximal region 42 of the insert's elongate body 38, so that the proximal region 42 is operatively received into the insert bore 66. Fifth, the lock pin 64 is translated within the pin bore 68 until the head 78 engages the external surface 80 of the block 62. This positioning of the lock pin 64 and its circumferential groove 92 restricts the lock-out assembly 36 from being removed from the proximal region 42 of the insert's elongate body 38, due to the pin body 70 being operatively within the circumferential groove 48 of the insert's elongate body 38. Then, the shackle 74 of a padlock 76 may be inserted through the shackle bore 72 of the lock pin 64 and operatively locked, resulting in the lock assembly 100 being operatively locked to the female drive receptacle 14 and female drive receptacle 14 thus being locked. Due to the mating of the pin body 70 with the circumferential groove 48 of the insert 32, the lock-out assembly is free to rotate about the elongate body 38 of the insert 32 without rotating the insert 32. Moreover, because the slide 34 and the lock-out assembly 36 effectively restrict access to the insert 32, the insert 32 cannot be engaged to be rotated and thus cannot rotate the shaft 16 of the female drive receptacle 14.

Illustrative, non-exclusive examples of inventive subject matter according to the present disclosure are described in the following enumerated paragraphs:

A. A lock assembly for a female drive receptacle, the lock assembly comprising an insert with a feature that is configured to permit selective insertion of the insert into the female drive receptacle when the insert is in a first rotational orientation and to selectively restrict removal of the insert from the non-circular receptacle when the insert is in a second rotational orientation that is offset from the first rotational orientation, wherein the lock assembly is configured to be locked to restrict rotation of the insert from the second rotational orientation to the first rotational orientation and thereby lock the lock assembly to the female drive receptacle.

A1. The lock assembly of paragraph A, wherein the lock assembly comprises the lock assembly of any of paragraphs B-C10.1.

B. A lock assembly for a female drive receptacle, the lock assembly comprising:

an insert with an elongate body having a distal region and a proximal region, wherein the distal region is configured to be selectively inserted into the female drive receptacle when the insert is in a first rotational orientation, and wherein the distal region is configured to restrict removal of the distal region from the female drive receptacle when the insert is in a second rotational orientation that is offset from the first rotational orientation;

a slide slidingly coupled to the insert and configured to selectively engage the female drive receptacle to selectively restrict rotation of the slide and the insert relative to the female drive receptacle; and a lock-out assembly configured to be selectively coupled to the proximal region of the elongate body to restrict translation of the slide from the distal region to the proximal region of the elongate body and to restrict access to the proximal region of the elongate body, wherein the lock-out assembly is further configured to be selectively restricted from being decoupled from the insert.

B1. The lock assembly of paragraph B, wherein the insert includes one or more distal projections extending radially outward from the distal region, wherein the one or more distal projections are sized to permit selective insertion of the distal region into the female drive receptacle when the insert is in the first rotational orientation, and wherein the one or more distal projections are sized to restrict removal of the distal region from the female drive receptacle when the distal region is positioned within the female drive receptacle and the insert is in the second rotational orientation.

B1.1. The lock assembly of paragraph B1, wherein an outer periphery of the one or more distal projections in profile defines in part a shape corresponding to the female drive receptacle, wherein the shape is a polygon, a triangle, a rectangle, a square, a pentagon, a hexagon, or star-shaped.

B1.2. The lock assembly of any of paragraphs B1-B1.1, wherein the insert further includes:

a proximal projection extending radially outward from the proximal region, wherein the proximal projection and the one or more distal projections collectively and operatively retain the slide coupled to the insert.

B2. The lock assembly of any of paragraphs B-B1.2, wherein the insert includes an insert slide feature;

wherein the slide is configured to be selectively translated along the elongate body of the insert, wherein the slide includes:

a slide insert feature mated with the insert slide feature, wherein the slide insert feature and the insert slide feature collectively restrict relative rotation between the insert and the slide; and a receptacle feature configured to be selectively inserted into the female drive receptacle and to restrict rotation of the slide relative to the female drive receptacle.

B2.1. The lock assembly of paragraph B2, wherein one of the insert slide feature and the slide insert feature is a groove, and wherein the other of the insert slide feature and the slide insert feature is a tab that is positioned in the groove.

B2.2. The lock assembly of any of paragraphs B2-B2.1, wherein the slide further includes a longitudinal projection, wherein the longitudinal projection defines the receptacle feature of the slide.

B2.2.1. The lock assembly of paragraph B2.2, wherein the insert includes one or more distal projections extending radially outward from the distal region, wherein the one or more distal projections are sized to permit selective insertion of the distal region into the female drive receptacle when the insert is in the first rotational orientation, and wherein the one or more distal projections are sized to restrict removal of the distal region from the female drive receptacle when the distal region is positioned within the female drive receptacle and the insert is in the second rotational orientation; and wherein an outer periphery of the longitudinal projection in profile defines in part a second shape corresponding to the female drive receptacle, wherein the second shape is the same as the first shape, and wherein the second shape is angularly offset from the first shape about a longitudinal axis of the insert.

B2.2.1.1. The lock assembly of paragraph B2.2.1, wherein the first shape and the second shape are a polygon, a triangle, a rectangle, a square, a pentagon, a hexagon, or star-shaped.

B3. The lock assembly of any of paragraphs B-B2.2.1.1, wherein an outer periphery of at least the distal region of the elongate body in profile defines in part a circle.

B3.1. The lock assembly of paragraph B3, wherein an outer diameter of the circle corresponds to an inner diameter of the female drive receptacle.

B4. The lock assembly of any of paragraphs B-B3.1, wherein the lock-out assembly includes:

a block, wherein the block defines an insert bore and a pin bore extending transverse to the insert bore, wherein the insert bore is configured to selectively receive the proximal region of the elongate body of the insert, and wherein the insert bore and the pin bore intersect within the block; and a lock pin positioned in the pin bore of the block, wherein the lock pin includes:

a pin body sized to extend through the pin bore of the block, wherein the pin body defines a shackle bore sized to receive a shackle of a padlock; and a head positioned opposite the shackle bore on the pin body and sized to engage an external surface of the block and restrict further translation of the lock pin through the pin bore;

wherein the lock pin and the proximal region of the elongate body of the insert are configured to permit rotation of the block and lock pin relative to the insert when the proximal region of the elongate body of the insert is operatively received in the insert bore of the block and when the lock pin is operatively received in the pin bore of the block.

B4.1. The lock assembly of paragraph B4, wherein the insert further includes a proximal projection extending radially outward from the proximal region; and wherein the insert bore extends only partially through the block, wherein the insert bore has a first region sized to receive the proximal projection and a second region sized to restrict receipt of the proximal projection into the second region.

B4.2. The lock assembly of any of paragraphs B4-B4.1, wherein the lock pin further includes a restrictive feature extending from the pin body opposite the head, wherein the head is positioned on one side of the block and the restrictive feature is positioned on the opposite side of the block, wherein the head and the restrictive feature collectively retain the lock pin to the block with the pin body in the pin bore of the block.

B4.3. The lock assembly of any of paragraphs B4-B4.2, wherein the pin body defines a circumferential groove positioned between the head and the shackle bore;

wherein when the circumferential groove of the pin body is aligned with the insert bore of the block, the proximal region of the elongate body of the insert is permitted to be operatively received into and withdrawn from the insert bore; and wherein when the circumferential groove of the pin body is not aligned with the insert bore of the block:
  the proximal region of the elongate body of the insert is restricted from being operatively received into the insert bore if not already operatively received into the insert bore; and
  the proximal region of the elongate body of the insert is restricted from being withdrawn from the insert bore if already operatively received into the insert bore.

B4.4. The lock assembly of any of paragraphs B4-B4.3, wherein the proximal region defines a circumferential groove;
  wherein when the circumferential groove of the proximal region is aligned with the pin bore of the block, the lock pin is permitted to be operatively translated within the pin bore; and
  wherein when the circumferential groove of the proximal region is not aligned with the pin bore of the block, the lock pin is restricted from being operatively translated within the pin bore.

B5. The lock assembly of any of paragraphs B-B4.4, wherein the lock assembly comprises the lock assembly of any of paragraphs C-C10.1.

C. A lock assembly for a female drive receptacle, wherein the female drive receptacle has a shaft with a longitudinal axis, a non-circular receptacle extending from an end face of the shaft along the longitudinal axis of the shaft, and a circumferential recess extending radially from the non-circular receptacle, the lock assembly comprising:
  an insert including:
    an elongate body having a distal region and a proximal region, wherein at least the distal region is shaped to be selectively inserted into the non-circular receptacle of the shaft;
    one or more distal projections extending radially outward from the distal region, wherein the one or more distal projections are sized to permit selective insertion of the distal region into the non-circular receptacle of the shaft when the insert is in a rotationally aligned orientation, and wherein the one or more distal projections are sized to extend into the circumferential recess of the shaft and restrict longitudinal motion of the insert when the insert is rotated from the rotationally aligned orientation to a rotationally misaligned orientation; and
    an insert slide feature;
  a slide slidingly coupled to the insert and configured to be selectively translated along the elongate body of the insert, wherein the slide includes:
    a slide insert feature mated with the insert slide feature, wherein the slide insert feature and the insert slide feature collectively restrict relative rotation between the insert and the slide; and
    a receptacle feature configured to be selectively inserted into the non-circular receptacle of the shaft and to restrict rotation of the slide relative to the shaft; and
  a lock-out assembly configured to be selectively coupled to the proximal region of the elongate body to restrict translation of the slide from the distal region to the proximal region of the elongate body and to restrict access to the proximal region of the elongate body, wherein the lock-out assembly is further configured to be selectively restricted from being decoupled from the insert.

C1. The lock assembly of paragraph C, wherein the non-circular receptacle is generally polygonal, triangular, rectangular, square, pentagonal, hexagonal, or star-shaped in cross-section.

C2. The lock assembly of any of paragraphs C-C1, wherein an outer periphery of at least the distal region of the elongate body in profile defines in part a circle, optionally wherein an outer diameter of the circle corresponds to an inner diameter of the non-circular receptacle.

C3. The lock assembly of any of paragraphs C-C1, wherein the distal region extends beyond the one or more distal projections relative to the proximal region.

C4. The lock assembly of any of paragraphs C-C3, wherein an outer periphery of the distal projections in profile defines in part a shape corresponding to the non-circular receptacle, optionally wherein the shape is a polygon, a triangle, a rectangle, a square, a pentagon, a hexagon, or star-shaped.

C5. The lock assembly of any of paragraphs C-C4, wherein the insert further includes:
  a proximal projection extending radially outward from the proximal region.

C5.1. The lock assembly of paragraph C5, wherein the proximal projection and the one or more distal projections collectively and operatively retain the slide coupled to the insert.

C5.2. The lock assembly of any of paragraphs C5-C5.1, wherein the proximal region defines a projection bore, and wherein the proximal projection is a projecting pin that is press-fit into the projection bore.

C6. The lock assembly of any of paragraphs C-C5.2, wherein the proximal region defines a circumferential groove.

C7. The lock assembly of any of paragraphs C-C6, wherein one of the insert slide feature and the slide insert feature is a groove, and wherein the other of the insert slide feature and the slide insert feature is a tab that is positioned in the groove.

C8. The lock assembly of any of paragraphs C-C7, wherein the slide includes a slide body that defines a slide bore through which the elongate body of the insert extends, wherein the slide body is sized to engage the end face of the shaft of the female drive receptacle when the distal region of the elongate body is inserted into the non-circular receptacle of the shaft and when the slide is translated along the elongate body toward the shaft.

C8.1. The lock assembly of paragraph C8, wherein the slide body is generally disc-shaped.

C8.2. The lock assembly of any of paragraphs C8-C8.1, wherein the slide further includes a longitudinal projection extending longitudinally from the slide body, wherein the longitudinal projection defines the receptacle feature of the slide.

C8.2.1. The lock assembly of paragraph C8.2, wherein an outer periphery of the longitudinal projection in profile defines in part a shape corresponding to the non-circular receptacle, optionally wherein the shape is a polygon, a triangle, a rectangle, a square, a pentagon, a hexagon, or star-shaped.

C8.2.2. The lock assembly of paragraph C8.2, when depending from paragraph C4, wherein the shape is a first shape, wherein an outer periphery of the longitudinal projection in profile defines in part a second shape corresponding to the non-circular receptacle, wherein the second shape is the same as the first shape, and wherein the second shape is angularly offset from the first shape about a longitudinal axis of the insert.

C9. The lock assembly of any of paragraphs C-C8.2.2, wherein the lock-out assembly includes:
  a block, wherein the block defines an insert bore and a pin bore extending transverse to the insert bore, wherein the insert bore is configured to selectively receive the proximal region of the elongate body of the insert; and a lock pin positioned in the pin bore of the block, wherein the lock pin includes:

a pin body sized to extend through the pin bore of the block, wherein the pin body defines a shackle bore sized to receive a shackle of a padlock; and a head positioned opposite the shackle bore on the pin body and sized to engage an external surface of the block and restrict further translation of the lock pin through the pin bore;

wherein the lock pin and the proximal region of the elongate body of the insert are configured to permit rotation of the block and lock pin relative to the insert when the proximal region of the elongate body of the insert is operatively received in the insert bore of the block and when the lock pin is operatively received in the pin bore of the block.

C9.1 The lock assembly of paragraph C9, wherein the insert bore extends only partially through the block.

C9.2. The lock assembly of any of paragraphs C9-C9.1, when depending from paragraph C5, wherein the insert bore has a first region sized to receive the proximal projection and a second region sized to restrict receipt of the proximal projection into the second region.

C9.3. The lock assembly of any of paragraphs C9-C9.2, when depending from paragraph C5, wherein the insert bore defines a shoulder that is sized to engage the proximal projection when the proximal region of the elongate body of the insert is inserted into the insert bore and restrict further insertion of the proximal region into the insert bore.

C9.4. The lock assembly of any of paragraphs C9-C9.3, wherein the pin bore extends perpendicular to the insert bore.

C9.5. The lock assembly of any of paragraphs C9-C9.4, wherein the insert bore and the pin bore intersect within the block.

C9.6. The lock assembly of any of paragraphs C9-C9.5, wherein the lock pin further includes a restrictive feature extending from the pin body opposite the head, wherein the head is positioned on one side of the block and the restrictive feature is positioned on the opposite side of the block, wherein the head and the restrictive feature collectively retain the lock pin to the block with the pin body in the pin bore of the block.

C9.6.1. The lock assembly of paragraph C9.6, wherein the restrictive feature includes one or more pin projections extending from the pin body.

C9.6.2. The lock assembly of any of paragraphs C9.6-C9.6.1, wherein the pin body is sized and the restrictive feature is positioned to permit selective translation of the lock pin within the pin bore of the block.

C9.7. The lock assembly of any of paragraphs C9-C9.6.2, wherein the pin body is sized so that the shackle bore is accessible outside the block when the head is engaged with the external surface of the block.

C9.8. The lock assembly of any of paragraphs C9-C9.7, wherein the pin body defines a circumferential groove positioned between the head and the shackle bore.

C9.8.1. The lock assembly of paragraph C9.8, wherein when the circumferential groove of the pin body is aligned with the insert bore of the block, the proximal region of the elongate body of the insert is permitted to be operatively received into and withdrawn from the insert bore; and wherein when the circumferential groove of the pin body is not aligned with the insert bore of the block:

the proximal region of the elongate body of the insert is restricted from being operatively received into the insert bore if not already operatively received into the insert bore; and the proximal region of the elongate body of the insert is restricted from being withdrawn from the insert bore if already operatively received into the insert bore.

C9.9. The lock assembly of any of paragraphs C9-C9.8, when depending from paragraph C6, wherein when the circumferential groove of the proximal region is aligned with the pin bore of the block, the lock pin is permitted to be operatively translated within the pin bore; and wherein when the circumferential groove of the proximal region is not aligned with the pin bore of the block, the lock pin is restricted from being operatively translated within the pin bore.

C10. The lock assembly of any of paragraphs C-C9.9, further comprising:

a tether that interconnects the slide and one of the block and the lock pin.

C10.1. The lock assembly of paragraph C10, wherein the slide defines an outer circumferential channel, and wherein the tether defines a loop positioned in the outer circumferential channel.

D. A method of locking a female drive receptacle utilizing the lock assembly of any of paragraphs C-C10.1, the method comprising:

inserting the distal region of the elongate body of the insert into the non-circular receptacle;

following the inserting, rotating the elongate body of the insert so that the one or more distal projections extend into the circumferential recess;

following the rotating, sliding the slide toward the female drive receptacle so that the receptacle feature enters the non-circular receptacle;

following the sliding, operatively coupling the lock-out assembly to the proximal region of the elongate body to restrict translation of the slide from the distal region to the proximal region of the elongate body; and following the operatively coupling, restricting the lock-out assembly from being decoupled from the proximal region of the elongate body.

D1. The method of paragraph D, when depending from paragraph C9, wherein the operatively coupling includes:

operatively positioning the lock pin within the pin bore of the block so that the proximal region of the elongate body of the insert may be received in the insert bore of the block;

following the sliding and the operatively positioning the lock pin, positioning the lock-out assembly so that the proximal region of the elongate body of the insert is operatively received within the insert bore; and following the positioning the block, further operatively positioning the lock pin within the pin bore so that the proximal region of the elongate body of the insert is restricted from being withdrawn from the insert bore of the block.

D1.1. The method of paragraph D1, wherein the restricting includes placing a padlock or other structure through the shackle bore.

E. A method of locking a female drive receptacle utilizing the lock assembly of any of paragraphs B-B4.4, the method comprising:

inserting the insert into the female drive receptacle;

following the inserting, rotating the insert;

following the rotating, sliding the slide into engagement with the female drive receptacle;

following the sliding, operatively coupling the lock-out assembly to the insert; and following the operatively coupling, restricting the lock-out assembly from being decoupled from the insert.

F. A method of locking a female drive receptacle, the method comprising:

inserting a distal region of an elongate body of an insert into the female drive receptacle;

following the inserting, rotating the elongate body;

following the rotating, sliding a slide toward and into engagement with the female drive receptacle;

following the sliding, operatively coupling a lock-out assembly to a proximal region of the elongate body to restrict translation of the slide from the distal region to the proximal region of the elongate body; and following the operatively coupling, restricting the lock-out assembly from being decoupled from the proximal region of the elongate body.

F1. The method of paragraph F, wherein the operatively coupling includes:

operatively positioning a lock pin within a pin bore of a block so that the proximal region of the elongate body of the insert may be received in an insert bore of the block;

following the sliding and the operatively positioning the lock pin, positioning the block so that the proximal region of the elongate body of the insert is operatively received within the insert bore; and following the positioning the block, further operatively positioning the lock pin within the pin bore so that the proximal region of the elongate body of the insert is restricted from being withdrawn from the insert bore of the block.

F2. The method of any of paragraphs F-F1, wherein the restricting includes placing a padlock or other structure through a shackle bore of the lock-out assembly.

F3. The method of any of paragraphs F-F2, utilizing the lock assembly of any of paragraphs A-C10.1.

G. The use of the lock assembly of any of paragraphs A-C10.1.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A lock assembly for a female drive receptacle, the lock assembly comprising:

an insert with an elongate body having a distal region and a proximal region, wherein the distal region is configured to be selectively inserted into the female drive receptacle when the insert is in a first rotational orientation, wherein the distal region is configured to restrict removal of the distal region from the female drive receptacle when the insert is in a second rotational orientation that is offset from the first rotational orientation, wherein the insert includes an insert slide feature, wherein the insert includes one or more distal projections extending radially outward from the distal region, wherein the one or more distal projections are sized to permit selective insertion of the distal region into the female drive receptacle when the insert is in the first rotational orientation, wherein the one or more distal projections are sized to restrict removal of the distal region from the female drive receptacle when the distal region is positioned within the female drive receptacle and the insert is in the second rotational orientation, and wherein an outer periphery of the one or more distal projections in profile defines in part a first shape corresponding to the female drive receptacle;

a slide slidingly coupled to the insert and configured to selectively engage the female drive receptacle to selectively restrict rotation of the slide and the insert relative to the female drive receptacle, wherein the slide is configured to be selectively translated along the elongate body of the insert, wherein the slide includes:

a slide insert feature mated with the insert slide feature, wherein the slide insert feature and the insert slide feature collectively restrict relative rotation between the insert and the slide; and a longitudinal projection that defines a receptacle feature configured to be selectively inserted into the female drive receptacle and to restrict rotation of the slide relative to the female drive receptacle, wherein an outer periphery of the longitudinal projection in profile defines in part a second shape corresponding to the female drive receptacle, wherein the second shape is the same as the first shape, and wherein the second shape is angularly offset from the first shape about a longitudinal axis of the insert; and a lock-out assembly configured to be selectively coupled to the proximal region of the elongate body to restrict translation of the slide from the distal region to the proximal region of the elongate body and to restrict access to the proximal region of the elongate body, wherein the lock-out assembly is further configured to be selectively restricted from being decoupled from the insert.

2. The lock assembly of claim 1, wherein the insert further includes:
a proximal projection extending radially outward from the proximal region, wherein the proximal projection and the one or more distal projections collectively and operatively retain the slide coupled to the insert.

3. The lock assembly of claim 1, wherein one of the insert slide feature and the slide insert feature is a groove, and wherein the other of the insert slide feature and the slide insert feature is a tab that is positioned in the groove.

4. The lock assembly of claim 1, wherein the first shape and the second shape are a polygon, a triangle, a rectangle, a square, a pentagon, a hexagon, or star-shaped.

5. The lock assembly of claim 1, wherein an outer periphery of at least the distal region of the elongate body in profile defines in part a circle.

6. The lock assembly of claim 5, wherein an outer diameter of the circle corresponds to an inner diameter of the female drive receptacle.

7. The lock assembly of claim 1, wherein the lock-out assembly includes:
a block, wherein the block defines an insert bore and a pin bore extending transverse to the insert bore, wherein the insert bore is configured to selectively receive the proximal region of the elongate body of the insert, and wherein the insert bore and the pin bore intersect within the block; and
a lock pin positioned in the pin bore of the block, wherein the lock pin includes:
a pin body sized to extend through the pin bore of the block, wherein the pin body defines a shackle bore sized to receive a shackle of a padlock; and
a head positioned opposite the shackle bore on the pin body and sized to engage an external surface of the block and restrict further translation of the lock pin through the pin bore;
wherein the lock pin and the proximal region of the elongate body of the insert are configured to permit rotation of the block and lock pin relative to the insert when the proximal region of the elongate body of the insert is operatively received in the insert bore of the block and when the lock pin is operatively received in the pin bore of the block.

8. The lock assembly of claim 7,
wherein the insert further includes a proximal projection extending radially outward from the proximal region; and
wherein the insert bore extends only partially through the block, wherein the insert bore has a first region sized to receive the proximal projection and a second region sized to restrict receipt of the proximal projection into the second region.

9. The lock assembly of claim 7, wherein the lock pin further includes a restrictive feature extending from the pin body opposite the head, wherein the head is positioned on one side of the block and the restrictive feature is positioned on the opposite side of the block, wherein the head and the restrictive feature collectively retain the lock pin to the block with the pin body in the pin bore of the block.

10. The lock assembly of claim 7,
wherein the pin body defines a circumferential groove positioned between the head and the shackle bore;
wherein when the circumferential groove of the pin body is aligned with the insert bore of the block, the proximal region of the elongate body of the insert is permitted to be operatively received into and withdrawn from the insert bore; and
wherein when the circumferential groove of the pin body is not aligned with the insert bore of the block:
the proximal region of the elongate body of the insert is restricted from being operatively received into the insert bore if not already operatively received into the insert bore; and
the proximal region of the elongate body of the insert is restricted from being withdrawn from the insert bore if already operatively received into the insert bore.

11. The lock assembly of claim 7,
wherein the proximal region defines a circumferential groove;
wherein when the circumferential groove of the proximal region is aligned with the pin bore of the block, the lock pin is permitted to be operatively translated within the pin bore; and
wherein when the circumferential groove of the proximal region is not aligned with the pin bore of the block, the lock pin is restricted from being operatively translated within the pin bore.

12. A method of locking a female drive receptacle, the method comprising:
inserting a distal region of an elongate body of an insert into the female drive receptacle;
following the inserting, rotating the elongate body;
following the rotating, sliding a slide toward and into engagement with the female drive receptacle;
following the sliding, operatively coupling a lock-out assembly to a proximal region of the elongate body to restrict translation of the slide from the distal region to the proximal region of the elongate body, wherein the operatively coupling includes:
operatively positioning a lock pin within a pin bore of a block so that the proximal region of the elongate body of the insert may be received in an insert bore of the block;
following the sliding and the operatively positioning the lock pin, positioning the block so that the proximal region of the elongate body of the insert is operatively received within the insert bore; and
following the positioning the block, further operatively positioning the lock pin within the pin bore so that the proximal region of the elongate body of the insert is restricted from being withdrawn from the insert bore of the block; and
following the operatively coupling, restricting the lock-out assembly from being decoupled from the proximal region of the elongate body of the insert.

13. The method of claim 12, wherein the restricting includes placing a padlock or other structure through a shackle bore of the lock-out assembly.

14. The method of claim 12, wherein the female drive receptacle is of a cargo bay door of an airplane, and wherein the female drive receptacle is accessible from outside the airplane and is configured to open and close the cargo bay door responsive to being rotated.

15. A lock assembly for a female drive receptacle, the lock assembly comprising:
an insert with an elongate body having a distal region and a proximal region, wherein the distal region is configured to be selectively inserted into the female drive receptacle when the insert is in a first rotational orientation, and wherein the distal region is configured to restrict removal of the distal region from the female drive receptacle when the insert is in a second rotational orientation that is offset from the first rotational orientation;

a slide slidingly coupled to the insert and configured to selectively engage the female drive receptacle to selectively restrict rotation of the slide and the insert relative to the female drive receptacle; and a lock-out assembly configured to be selectively coupled to the proximal region of the elongate body to restrict translation of the slide from the distal region to the proximal region of the elongate body and to restrict access to the proximal region of the elongate body, wherein the lock-out assembly is further configured to be selectively restricted from being decoupled from the insert wherein the lock-out assembly includes:

a block, wherein the block defines an insert bore and a pin bore extending transverse to the insert bore, wherein the insert bore is configured to selectively receive the proximal region of the elongate body of the insert, and wherein the insert bore and the pin bore intersect within the block; and a lock pin positioned in the pin bore of the block, wherein the lock pin includes:

a pin body sized to extend through the pin bore of the block, wherein the pin body defines a shackle bore sized to receive a shackle of a padlock; and a head positioned opposite the shackle bore on the pin body and sized to engage an external surface of the block and restrict further translation of the lock pin through the pin bore;

wherein the lock pin and the proximal region of the elongate body of the insert are configured to permit rotation of the block and the lock pin relative to the insert when the proximal region of the elongate body of the insert is operatively received in the insert bore of the block and when the lock pin is operatively received in the pin bore of the block.

16. The lock assembly of claim 15,
wherein the insert further includes a proximal projection extending radially outward from the proximal region; and
wherein the insert bore extends only partially through the block, wherein the insert bore has a first region sized to receive the proximal projection and a second region sized to restrict receipt of the proximal projection into the second region.

17. The lock assembly of claim 15, wherein the lock pin further includes a restrictive feature extending from the pin body opposite the head, wherein the head is positioned on one side of the block and the restrictive feature is positioned on the opposite side of the block, wherein the head and the restrictive feature collectively retain the lock pin to the block with the pin body in the pin bore of the block.

18. The lock assembly of claim 15,
wherein the pin body defines a circumferential groove positioned between the head and the shackle bore;
wherein when the circumferential groove of the pin body is aligned with the insert bore of the block, the proximal region of the elongate body of the insert is permitted to be operatively received into and withdrawn from the insert bore; and
wherein when the circumferential groove of the pin body is not aligned with the insert bore of the block:
the proximal region of the elongate body of the insert is restricted from being operatively received into the insert bore if not already operatively received into the insert bore; and
the proximal region of the elongate body of the insert is restricted from being withdrawn from the insert bore if already operatively received into the insert bore.

19. The lock assembly of claim 15,
wherein the proximal region defines a circumferential groove;
wherein when the circumferential groove of the proximal region is aligned with the pin bore of the block, the lock pin is permitted to be operatively translated within the pin bore; and
wherein when the circumferential groove of the proximal region is not aligned with the pin bore of the block, the lock pin is restricted from being operatively translated within the pin bore.

20. The lock assembly of claim 15, wherein the insert includes one or more distal projections extending radially outward from the distal region, wherein the one or more distal projections are sized to permit selective insertion of the distal region into the female drive receptacle when the insert is in the first rotational orientation, and wherein the one or more distal projections are sized to restrict removal of the distal region from the female drive receptacle when the distal region is positioned within the female drive receptacle and the insert is in the second rotational orientation.

21. The lock assembly of claim 20, wherein an outer periphery of the one or more distal projections in profile defines in part a shape corresponding to the female drive receptacle, wherein the first shape is a polygon, a triangle, a rectangle, a square, a pentagon, a hexagon, or star-shaped.

22. The lock assembly of claim 20, wherein the insert further includes:
a proximal projection extending radially outward from the proximal region, wherein the proximal projection and the one or more distal projections collectively and operatively retain the slide coupled to the insert.

23. The lock assembly of claim 15,
wherein the insert includes an insert slide feature;
wherein the slide is configured to be selectively translated along the elongate body of the insert, wherein the slide includes:
a slide insert feature mated with the insert slide feature, wherein the slide insert feature and the insert slide feature collectively restrict relative rotation between the insert and the slide; and
a receptacle feature configured to be selectively inserted into the female drive receptacle and to restrict rotation of the slide relative to the female drive receptacle.

24. The lock assembly of claim 23, wherein one of the insert slide feature and the slide insert feature is a groove, and wherein the other of the insert slide feature and the slide insert feature is a tab that is positioned in the groove.

25. The lock assembly of claim 23, wherein the slide further includes a longitudinal projection wherein the longitudinal projection defines the receptacle feature of the slide.

26. The lock assembly of claim 15, wherein an outer periphery of at least the distal region of the elongate body in profile defines in part a circle.

27. The lock assembly of claim 26, wherein an outer diameter of the circle corresponds to an inner diameter of the female drive receptacle.

* * * * *